US008234374B2

(12) United States Patent
Marcjan et al.

(10) Patent No.: US 8,234,374 B2
(45) Date of Patent: Jul. 31, 2012

(54) PRIVACY MODEL THAT GRANTS ACCESS RIGHTS AND PROVIDES SECURITY TO SHARED CONTENT

(75) Inventors: Cezary Marcjan, Redmond, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 10/832,158

(22) Filed: Apr. 26, 2004

(65) Prior Publication Data
US 2005/0251675 A1    Nov. 10, 2005

(51) Int. Cl.
*G06F 15/173*    (2006.01)
(52) U.S. Cl. .............................. 709/225; 709/205; 726/3
(58) Field of Classification Search .................... 706/45; 709/224, 225, 205; 726/3
See application file for complete search history.

(56) References Cited

U.S. PATENT DOCUMENTS

| | | | |
|---|---|---|---|
| 5,675,782 A | 10/1997 | Montague et al. | |
| 5,761,669 A | 6/1998 | Montague et al. | |
| 5,941,947 A | 8/1999 | Brown et al. | |
| 6,205,472 B1 * | 3/2001 | Gilmour | 709/206 |
| 6,412,070 B1 | 6/2002 | Van Dyke et al. | |
| 6,574,736 B1 | 6/2003 | Andrews | |
| 6,978,247 B1 * | 12/2005 | Bogart et al. | 705/8 |
| 6,981,155 B1 * | 12/2005 | Lyle et al. | 726/22 |
| 7,231,206 B2 * | 6/2007 | Cudak et al. | 455/414.2 |
| 7,249,123 B2 * | 7/2007 | Elder et al. | 1/1 |
| 7,353,533 B2 * | 4/2008 | Wright et al. | 726/1 |
| 7,467,212 B2 * | 12/2008 | Adams et al. | 709/229 |
| 2001/0037467 A1 * | 11/2001 | O'Toole et al. | 713/201 |
| 2002/0026592 A1 * | 2/2002 | Gavrila et al. | 713/201 |
| 2002/0091947 A1 * | 7/2002 | Nakamura | 713/202 |
| 2002/0124053 A1 * | 9/2002 | Adams et al. | 709/216 |
| 2003/0108173 A1 * | 6/2003 | Gray | 379/201.02 |
| 2004/0064552 A1 * | 4/2004 | Chong et al. | 709/224 |
| 2004/0230834 A1 * | 11/2004 | McCallam | 713/201 |
| 2005/0086300 A1 * | 4/2005 | Yeager et al. | 709/204 |
| 2005/0210115 A1 * | 9/2005 | Naito et al. | 709/206 |

OTHER PUBLICATIONS

R. Kanawati and M. Riveill. Access Control Model for Groupware Applications. HCI'95: People and Computers, 1995. 9 pages.
J.E. Tidswell, G.H Outhred, and J.M. Potter. Dynamic Rights: Safe Extensible Access Control. Proceedings of the 4th ACM Workshop on Role-based Access Control, pp. 113-120, 1999.

* cited by examiner

*Primary Examiner* — Jeffrey Nickerson
(74) *Attorney, Agent, or Firm* — Lee & Hayes, PLLC (57) ABSTRACT

Systems and/or methods that mitigate overexposure of shared content and that facilitate improving security of content in a computing environment are provided. In particular, the systems and methods involves monitoring resource activities such as user interactions (between users and/or between users and resources), email activity, share space activity, shared content activity, distribution lists, contact lists, personnel or organization structures, and the like. Data can be collected as one or more resource activities are monitored and then analyzed to determine where, if any, changes have taken place. For example, if a user has been removed from a distribution list or a user has not accessed the shared content within a time period, a recommendation can be formulated to suggest an adjustment to the affected access rights. Furthermore, the systems and/or methods can be integrated with other applications such as an email client, whereby an out-of-office indicator can leave access rights as they are.

26 Claims, 9 Drawing Sheets

PRIVACY MODEL THAT GRANTS ACCESS RIGHTS AND PROVIDES SECURITY TO SHARED CONTENT

TECHNICAL FIELD

The present invention relates generally to networked-computing environments, and in particular to monitoring and adjusting access rights when necessary to improve security and privacy of shared content and content, in general.

BACKGROUND OF THE INVENTION

Computers were developed to aid people with repetitive tasks that were deemed to be extremely time consuming. Most of the early computers were used for complex mathematical problem solving. The first computing machines were extremely large compared to computers utilized today. Despite their enormous size, the early machines had vastly less computing power than today's machines. Generally speaking, the sizes of computing devices were driven by the sizes of the existing electronic components of that era. This meant that only large research facilities or big businesses could employ computing machines. As new technology allowed for smaller electronic devices to be developed, computing devices also diminished in size. Although still lacking in power by today's standards, the size of the computing machine was reduced enough that it could be placed on a typical desk. Thus, the "desktop computer" was born. This allowed users to have computing technology available in locations other than a central computing building. People found that having the capability to utilize computing technology at their work desk, rather than submitting computing problems to a central location, made them much more productive at their jobs. Eventually, the idea of moving the desktop computer to the home environment to provide even more convenience for doing work became a reality.

When the computer was brought into the home, it became obvious that there were other uses for it besides work. This allowed people to view the computer as not only a work tool, but also as a helpful device that could be used to play games, aid in learning, handle telecommunications for the home, and even control home appliances and lighting, for example. Generally speaking, however, a user was restricted to computing information available only on that computer. A game could be installed on the desktop computer and played on that computer, but one could not play others who had computers at other locations. Technology came to the rescue with a first attempt at connecting these computers utilizing telephonic modem technology. This permitted individual users to connect via direct dial-up telephone connections. This was great for local telephone calls, but enormously expensive for long distance calls. However, with the advent of the Internet, all that has changed. It provides an inexpensive means to connect computers from all over the world. This allows users to quickly and easily transmit and receive information on a global scale. Businesses fully embraced this new technology, creating paperless and wireless office environments. Now users can send receive, and share information online or by way of a network connection. This means of accessing and sharing a wealth of information has become a staple for our society.

Unfortunately, the substantial advances in sharing and accessing shared information have given rise to new privacy and security concerns. For example, in networked computing environments where files are increasingly shared across groups, users may be unaware of resources that are overexposed. Thus, no amount of security measures against potential hackers can protect shared content from those who at one time had legitimate access rights, but perhaps now having such rights would be detrimental to the security and/or integrity of the information.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitate improving privacy and security of shared content in the interaction between people using computing devices. More specifically, interactions between users such as sharing and publishing activities can be monitored and learned. As a result, advice may be provided to a user to modify access rights when necessary or to make adjustments to various resources in the system such as documents and file shares to mitigate overexposure of such resources. Access determinations can be based in part on cross-referencing various data sources related to the particular resources. Examples of such data sources include but are not limited to changes in various access and distribution lists, changes in user behavior (with respect to shared content), changes in user-granted access rights, and/or organizational structure changes (e.g., in a corporate or business environment).

According to one aspect of the present invention, user interactions with respect to shared content can be monitored. Data can be collected and/or stored and then analyzed to determine which users have become "idle" and which users are "new". For example, a shared file space can be created by a first user. The first user can then grant access rights to at least a second user. Additionally, the first user can share at least a portion of content (e.g., from a shared file space) with at least a second user such as by email (e.g., attachment). If the second user is not listed as having access rights, then one aspect of the invention involves suggesting to the first user (e.g., owner of shared content) to add such access rights for the second user.

Perhaps more importantly, the system and/or method of the present invention can also recommend adjusting or removing access rights for users who have become idle in one way or another, who have been removed from distribution lists, or who are no longer associated with the owner of the share space. For example, after monitoring activity of share space users over a designated period of time, it can be determined that a user has not accessed the share space or content during the prescribed time period. Consequently, the system or method can suggest to the owner of the shared content that any corresponding access rights should be disassociated or taken away from the idle user. Hence, the security of the shared content is not compromised in this respect and overexposure of the content can be mitigated. Furthermore, the distribution of access rights can be managed more readily; and consistency in delineating access rights can be maintained.

Similar action can be taken with respect to users who have been removed from distribution lists, contact lists, and/or from an organizational (personnel) structure, for example. Their removal from such lists can invoke a suggestion to be made to the owner of the shared content to remove and/or modify the corresponding access rights as well.

Another aspect of the invention provides monitoring the activity of a shared content space. In particular, after a period of inactivity, the system and/or method of the invention can recommend to delete or remove the share space. Similarly, content within a share space which has been inactive (e.g., not accessed or modified in a given period of time) can be removed from the share space as well. The user or owner of the share space can be presented with a warning message or suggestion box. If no action is taken, the warning messages or suggestions can continue to issue for an amount of time as determined by the user or by default settings.

After a subsequent time period passes and still no action has been taken, the share space can be suspended, removed, or archived. Suspending the share space may involve suspending substantially all user access to the share space except for the owner. Access to the share space can continue to be suspended until the owner reactivates the content or the share space.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Thus far, the greatest emphasis in improving security of computer systems rested on low-level software subsystems such as underlying protocols, fixing bugs in APIs, modifications or creation of new computing models, data encryption or new standards. Unlike conventional practices, the present invention concentrates on user interaction with computing devices. In general, the systems and methods described herein can be designed to help users in the identification of resources which may be overexposed and where access rights can be adjusted to mitigate comprising security and privacy of computer content.

From a user's day-to-day interaction with a computing device, the systems and methods can also learn about social groups and their relationships and interactions between groups as well as between individual users. Exemplary forms of social groups include but are not limited to social circles, project workgroups, distribution lists, access rights lists, personal and work-related lists, and the like.

There can be several resources or sources of information including relationships derived from sharing/publishing activities such as documents shared via email, files shared on network shares or websites and information collected based in part on a user's interaction with his computing device: relationships of documents derived from activities such as copy-paste operations, switching between documents, presence in the same share space, common people having access rights to similar resources, etc.

By looking at these various data sources, the systems and methods of the present invention can, for example, determine not only what share space could be created and identify who should have access rights but can also recommend which access rights (e.g., correspond to particular user(s)) should be modified (e.g., identify users that should be removed from an access list). For example, if a person is removed from one access list or workgroup, then a recommendation regarding access to other resources can be issued to potentially lead to further access restrictions.

Figure 1:
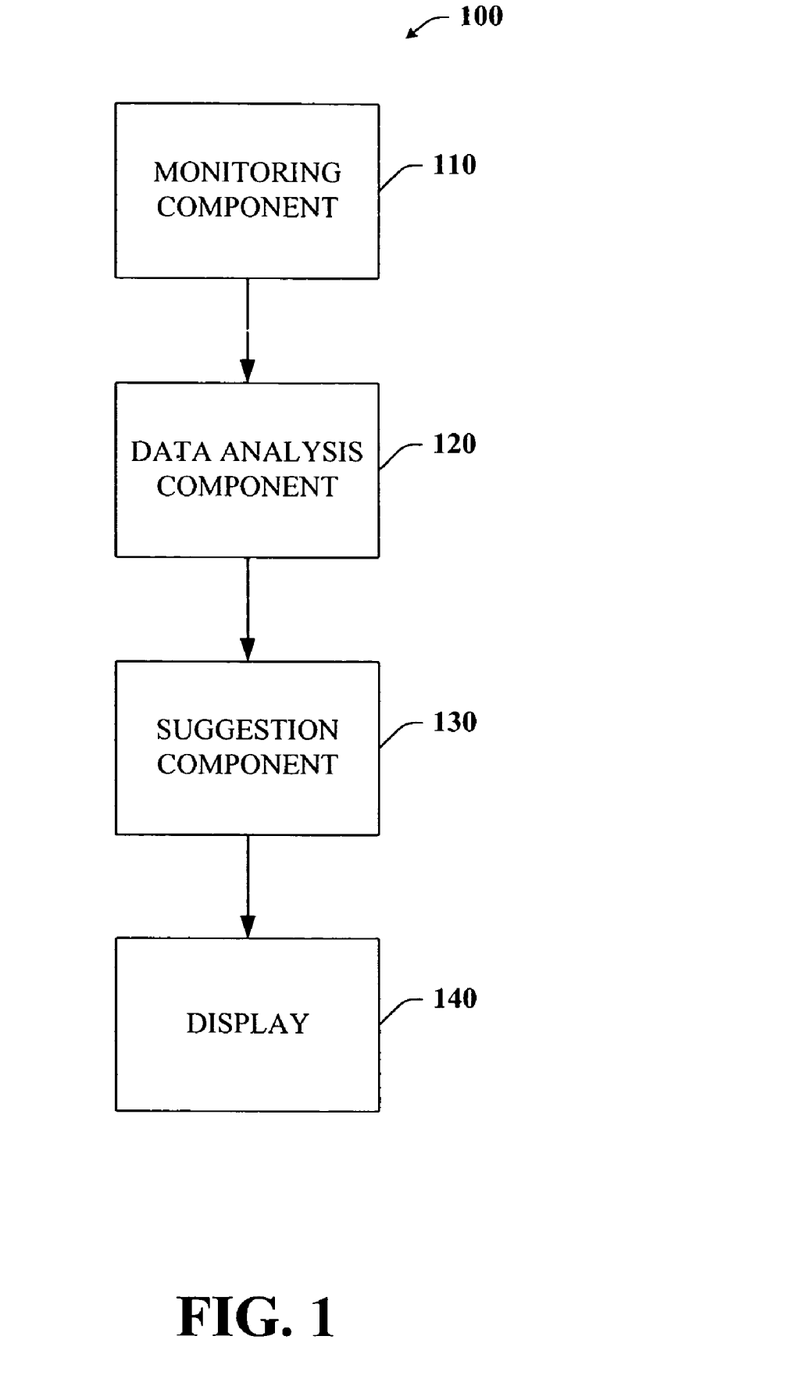
FIG. 1 is a high level block diagram of a system that facilitates optimizing privacy and security of a computing environment in accordance with an aspect of the present invention.

Referring now to FIG. 1, there is a high level block diagram of a system 100 that facilitates optimizing privacy and security of shared content within a computing environment in accordance with an aspect of the present invention. The system 100 comprises a monitoring component 110 that can monitor a plurality of resources and user interactions in connection with the resources. Exemplary resources include but are not limited to email or messaging communication, database activity (e.g., accessing files or other content from a database), distribution lists, access lists, and any other user-generated lists, and/or personnel activity at multiple levels (e.g., product group, department, and/or work or project group).

In particular, the monitoring component 110 can monitor the activities of any one of the above resources. For example, it can monitor messages that are sent and collect data therefrom such as the sender and recipients of the message as well as any content in the form of an attachment. The content can be identified by name as well as by "owner" (author or creator). The content can also be cross-referenced to one or more databases and/or one or more share spaces.

Any relevant data can be analyzed by a data analysis component 120 to determine what if any changes have been made to at least one of the many resources being monitored. For instance, imagine that recipients A, B, and C of sender Q's messages regularly receive content or files from Q, and thus have access rights to such content. The content may be maintained for A, B, and C in a share space, thus they may also have access rights to the share space. However, after continuous monitoring of content forwarded by or sent from sender Q, the data may indicate that recipient C has not received content from sender Q over a given time period, has not accessed the share space in that time period, and/or has not received or even sent any messages to sender Q in that time period.

The data analysis component 120 can determine that recipient C no longer interacts with sender Q. This analysis can be communicated to a suggestion component 130 for further action. The suggestion component 130 can issue a recommendation to sender Q (e.g., owner of shared content) to adjust recipient C's access rights. For example, the suggestion can be to restrict or remove Q-based access rights assigned to recipient C (e.g., only those granted by sender Q). This can be particularly helpful since it is relatively easy to forget to adjust or remove access rights in the midst of business or relationship changes (e.g., people switching jobs, positions, ending, altering, and starting relationships, etc).

Thus, the suggestion component 130 can make suggestions to the owner of the shared content regarding whether to modify or adjust access rights. Suggestions can be made as needed; however, if no response to any suggestion is received by the suggestion component 130 or by the system 100, the suggestion component 130 can repeatedly issue the same suggestion at timed intervals, for example. Optionally, the suggestion component can at least temporarily suspend access rights to all questionable users until the owner reactivates such access. A questionable user can be one that currently has access rights, but data collected and analyzed indicates that the user probably should not have or need such access rights at the present time.

Suggestions can appear in any suitable manner on a computing display 140 or user interface to notify or encourage the owner to adjust access rights where and when appropriate. For example, an icon can be added to the particular users' names whose access rights may require modification. Alternatively, the font color can change or a pop-up window can be shown to notify the owner that the privacy and/or security of the shared content are possibly out of date or inconsistent with current use.

In addition to adjusting access rights down (e.g., restricting or removing them), they can also be adjusted up (e.g., adding or increasing access rights). Such upward adjustments can also be accomplished in part by suggestions made by the suggestion component 130. For example, if a user has access rights to 3 out of 4 documents in a share space and appears to communicate frequently with the owner of the share space and also appears to receive such documents by way of a messaging subsystem (e.g., email, instant messaging, chat, etc.), then the data may also reflect and conclude that the user should be given access rights to the share space as a whole. A suggestion can be made to this effect by the suggestion component 130. It should be appreciated that the owner of a share space or of shared content can explicitly decline the system's 100 recommendations.

Moreover, the monitoring component 110 and the suggestion component 130 cooperate together to effectively provide suggestions according to relevant user access rights. In addition to monitoring activities based on user interactions, activity associated with the shared content can be monitored as well. More specifically, the monitoring component can detect a lack of activity with respect to a particular file share or to shared content, for example. Inactivity can be determined by a lack of access attempts within a given time frame (e.g., days, months, or years).

Upon analyzing the collected data, the suggestion component 130 can propose deleting or discarding the particular content or file share to the owner or manager of the file share. Hence, by monitoring various types of resource activity or inactivity, as the case may be, security and/or privacy of content can be maintained and undue exposure of content can be mitigated.

Figure 2:
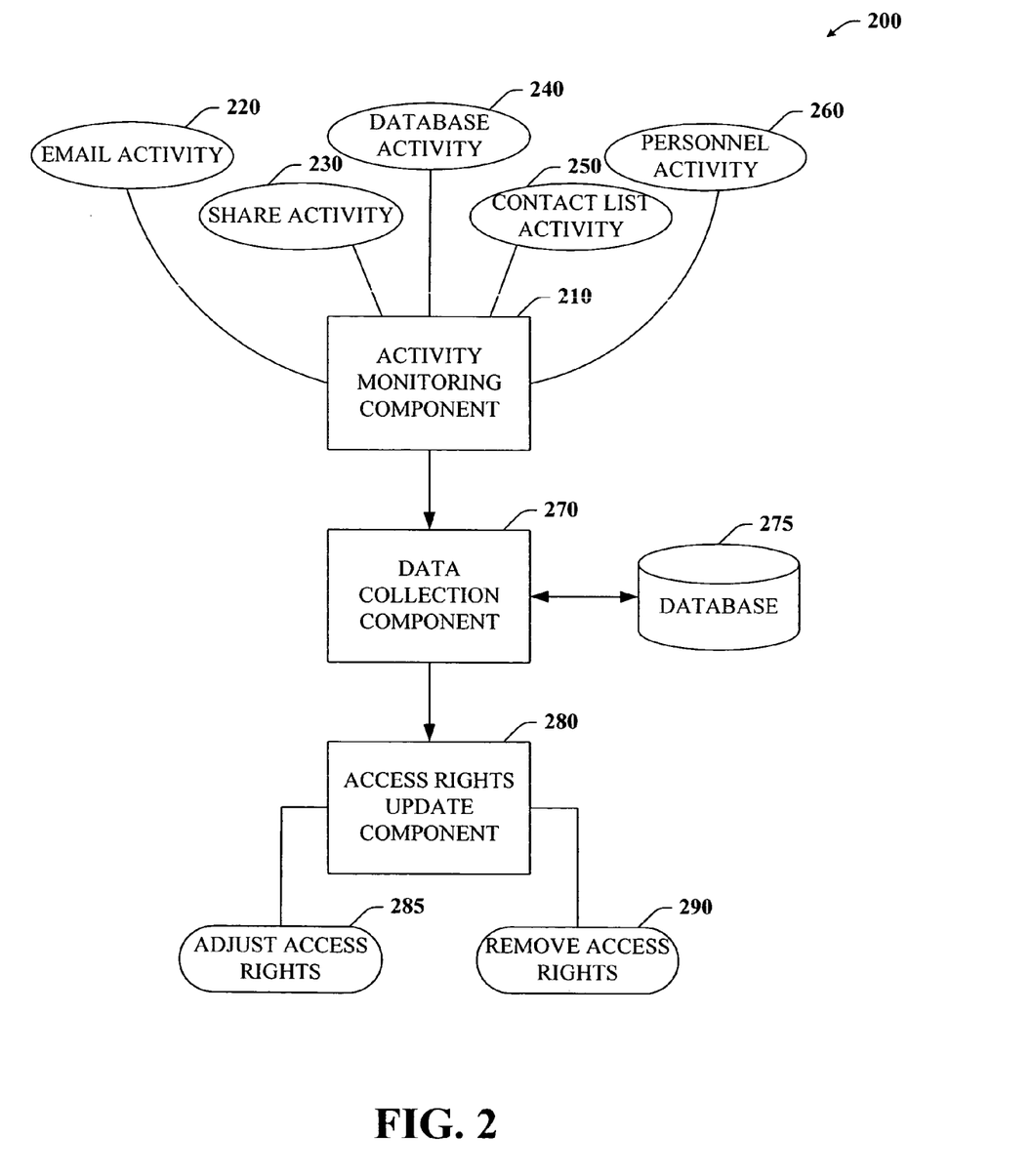
FIG. 2 is a schematic block diagram of a system that provides monitoring of various types of activities and/or interactions between users and/or one or more activities in accordance with another aspect of the present invention.

Referring now to FIG. 2, there is illustrated a schematic block diagram of a system 200 that provides monitoring of various types of activities and/or interactions between users and/or one or more activities in accordance with an aspect of the present invention. The system 200 comprises an activity monitoring component 210 that can monitor various types of activities concurrently or in any random successive manner. The types of activities can include email or messaging activity 220, share activity 230, database activity 240, contact list activity 250, and/or personnel activity 260. Further discussion regarding these types of activities can be found below with respect to FIGS. 3-6.

Observations and/or data can be collected by the monitoring component 210 and communicated to a data collection component 270. The data collection component can examine data as it is being collected to determine to what extent access rights should be updated. A database 275 can be operatively connected to the data collection component 270 and can be employed to store at least a subset of the data collected from the activity monitoring component 210. Finally, an access rights update component 280 can be invoked to propose to the creator or owner of such content that access rights belonging to one or more users can be adjusted 285 and/or removed completely 290.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
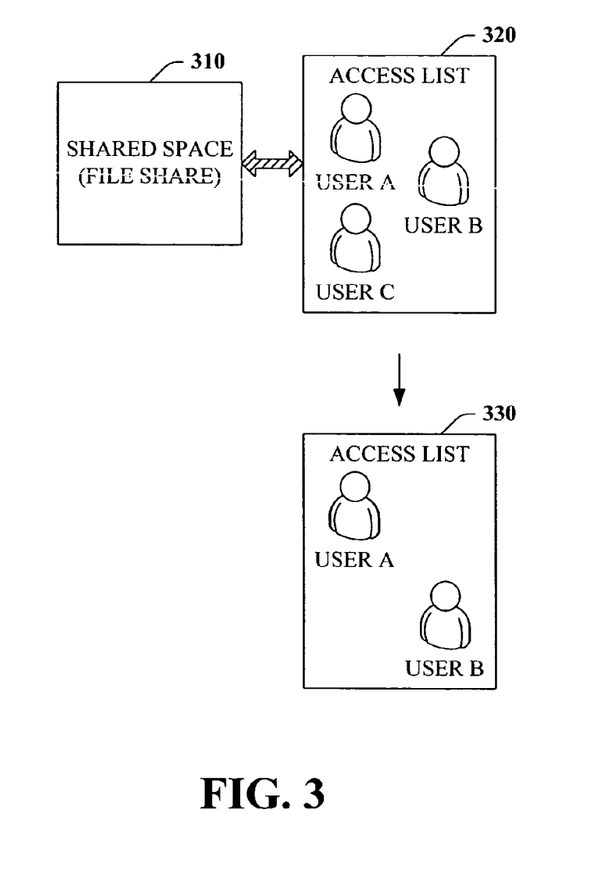
FIG. 3 is a schematic block diagram of an interaction between share space and users may or may not have access to such share space in accordance with yet another aspect of the present invention.
Figure 4:
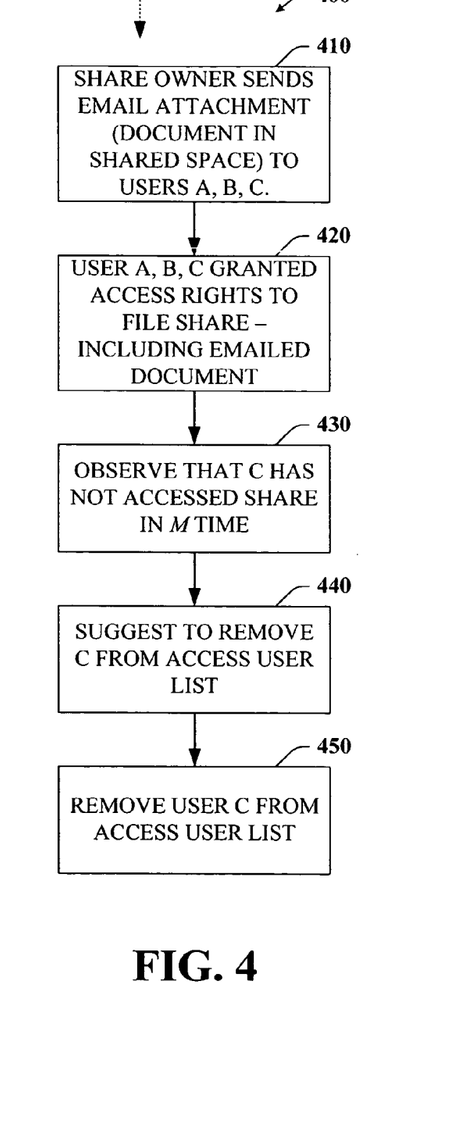
FIG. 4 is a flow diagram of an exemplary methodology that facilitates optimizing privacy and security of content in a share space which corresponds to the schematic diagram of FIG. 3 in accordance with still another aspect of the present invention.

FIGS. 3 and 4 can be described in tandem as they relate to one another. In FIG. 3, there is illustrated a schematic diagram demonstrating an interaction 300 between a share space 310 (e.g., network file share) and an access list 320 comprising some number of users who have obtained access rights to the share space 310. FIG. 4 is a flow diagram of an exemplary methodology 400 that describes the interaction 300 between the share space 310 and the access list 320 according to an aspect of the invention. At 410 of the methodology 400, the owner or creator of the share space 310 sends a document by way of email or some other messaging system to users A, B, and C. As a result, at 420, users A, B, and C can be granted access rights to the file share 310 as well as to the particular document.

A monitoring system (not shown) that can monitor the different interactions between the access list 320 and the share space 310 and between the access list 320 and the owner of the share space 310 may observe at 430 that user C has not accessed the share space 310 in m units of time (where m is an integer greater than or equal to one). Thus, at 440, the method 400 can recommend to remove user C from the access list 320 to facilitate maintaining and optimizing a secure share space 310 and an overall secure computing environment. Assuming that the creator of the share space 310 agrees to such a suggestion, user C can be disassociated from the access list 320, thereby removing user C's access rights to the share space 310—as evidenced by the updated access list 330.

Although not depicted in FIGS. 3 and 4, now imagine a subsequent document was attached to a message sent from the owner of the share space 310 to users A, B, and D. Users A and B are recognized as being on the access list 320 and thus, as having access rights to the particular document as well as to the share space 310—from where the document can be accessed. User D, however, does not appear on the access list 320. As soon as the first message to user D is observed, the method 400 can suggest granting access rights relating to the share space 310 to user D; or rather, to recommend adding user D to the access list 320. User D can easily be added to the access list 320 and granted access rights to the share space 310.

Now suppose that users A, B, and D leave the company and are replaced by new users E, F, G, and H. Users E and F are granted access rights to only a first subset of files in the share space 310 and users G and H are granted access rights to only a second subset of files. In order to optimize security of shared content, the owner of the share space 310 can be requested to split the share. This may be because users E and F do not require or need access to any other content in the share. The same can be said with respect to users G and H. Hence, the share space 310 can be split into one or more share subsets (not shown) to mitigate security concerns and unnecessary overlapping of access rights and shared content.

Figure 5:
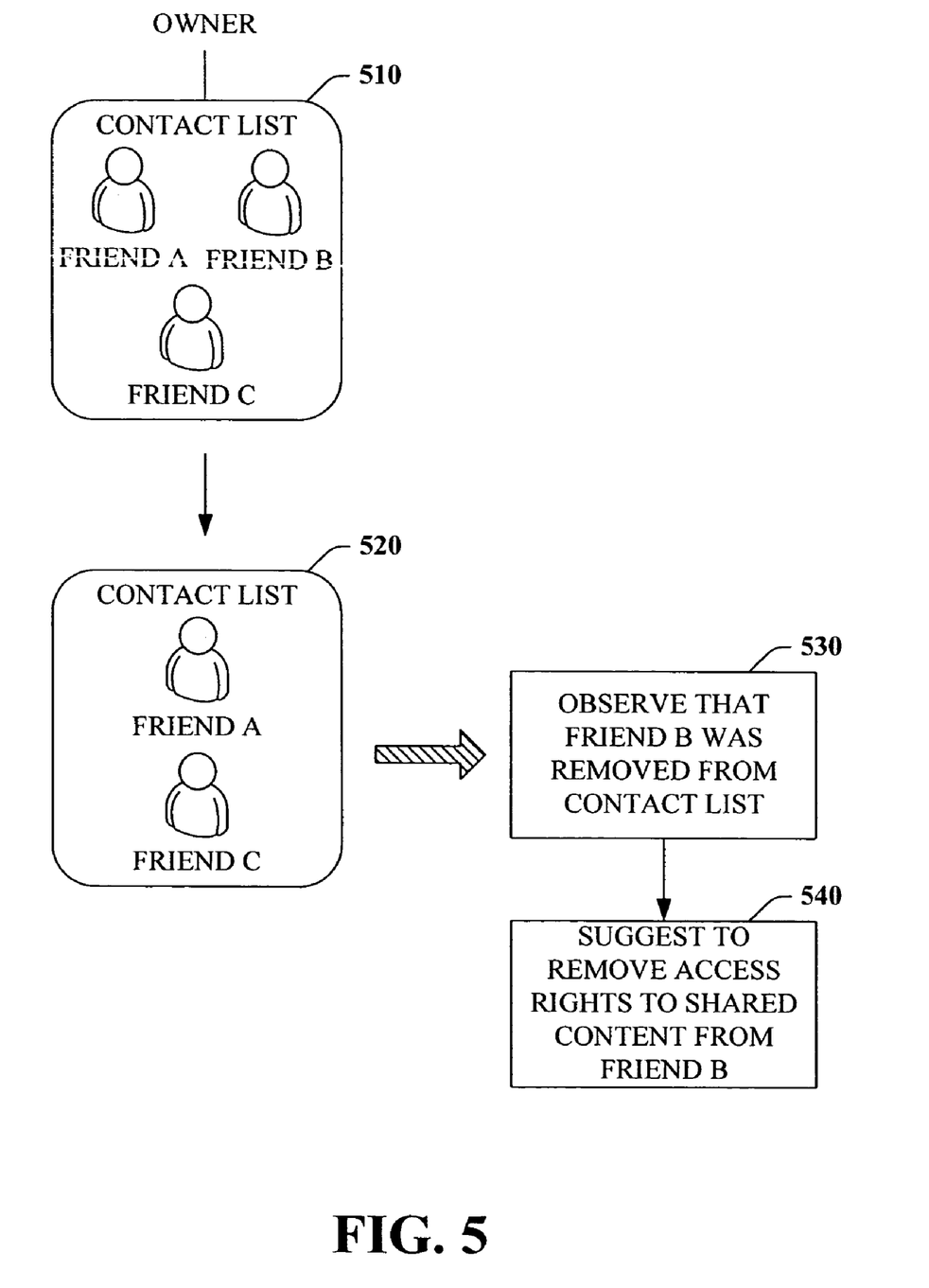
FIG. 5 is a schematic block diagram demonstrating monitoring of contact lists and updating user access rights according to user status in accordance with an aspect of the present invention.

Referring now to FIG. 5, there is illustrated a schematic diagram demonstrating the monitoring of contact list activity and its potential effect on the adjustment of access rights. Imagine that a user may have a distribution or contact list of business or personal contacts that are regularly granted access to the user's content. From time to time, contacts can be removed or added to the lists. Unlike granting access rights as they are needed, the user may forget to withdraw access rights when a person is removed from a list. As a result, "deleted" individuals can continue to access the user's private content.

This can be further visualized by the diagram in FIG. 5. In particular, a contact list 510 comprises any number of people or users such as friends A, B, and C. Imagine that friends A, B, and C all have access rights to shared content owned by Best Friend. Recently, however, friend B and Best Friend end their relationship and Best Friend removes friend B from the contact list 510—as seen in the adjusted contact list 520—at 530. Because the contact list activity can be monitored, a suggestion to remove friend B's access rights to the shared content can be issued to the owner of the shared content (e.g., Best Friend) at 540. Otherwise, friend B may still have access to Best Friend's content indefinitely or until Best Friend remembers to withdraw B's access rights.

Figure 6:
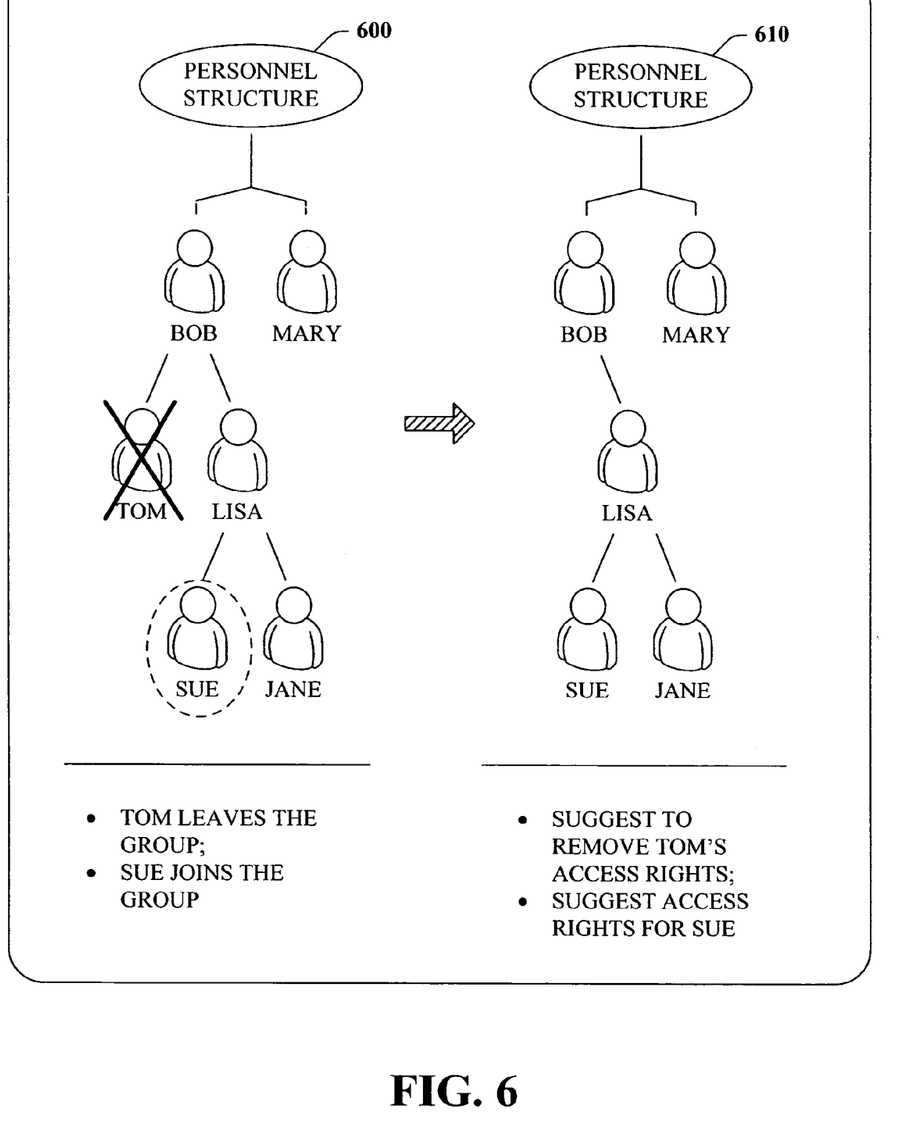
FIG. 6 is a schematic diagram illustrating the monitoring of organizational structures and recommending updates to access rights according to the current state of the organizational structure in accordance with an aspect of the present invention.

Another type of activity monitoring is illustrated in FIG. 6, which depicts a schematic block diagram of changes occurring within an organization or personnel structure 600, 610. The personnel structure can be representative of a work group, department, or entire company. Imagine that BOB has given TOM access rights to documents and other shared content. BOB regularly sends emails with attachments to TOM and also identifies TOM as a work contact on a distribution and/or contact list. Furthermore, TOM regularly accesses the shared content authored, created, and/or managed by BOB.

However, TOM has recently left the group as shown in the figure (e.g., indicated by the "X" over TOM). Therefore, TOM's access rights can be modified or taken away altogether in order to maintain the security of the shared content as well as any other content to which he may have had access. Recalling and tracking TOM's access rights across documents and/or file shares can be a rather cumbersome process. Fortunately, the personnel structure as well as databases, file shares, messages, etc. can be monitored to call attention to changes which may affect access and access rights. In the present case, such changes to the personnel structure, in particular, can be detected and then acted upon in an appropriate manner. In particular, BOB, as the owner of the particular content which was accessible by TOM, can be asked whether TOM's access rights for such relevant databases, file shares, and the like should be withdrawn.

Changes to the personnel structure can also include the addition of new people. For example, SUE has joined the group as indicated by the dashed line encircling her in the structure. In one approach, general or low level access rights can be granted to her according to her position in the group (e.g., working under LISA and alongside JANE). Alternatively or in addition, LISA and/or JANE can be asked whether SUE should be granted any access rights to any content authored or owned by them respectively (e.g., in advance of SUE needing such access) so as to provide a smooth and seamless transition for SUE. Moreover, access rights to secure and/or private content can be controlled and managed more easily and readily by monitoring and observing the activity of personnel or organization structures in addition to user interactions.

Figure 7:
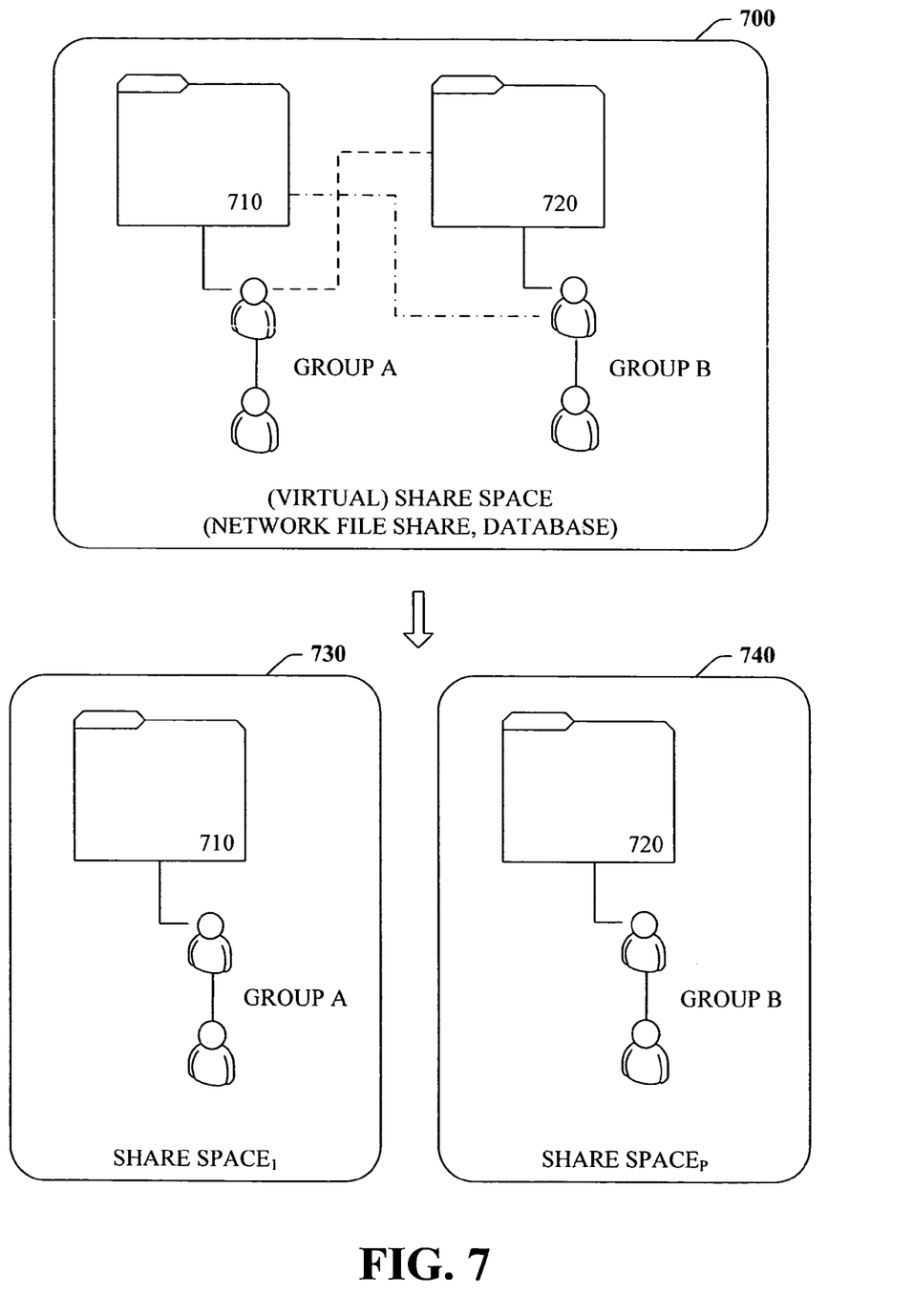
FIG. 7 is a schematic diagram illustrating the monitoring of shared content and recommending splitting of shares to facilitate overall security of content in accordance with an aspect of the present invention.

Turning now to FIG. 7, there is illustrated a schematic diagram demonstrating that share spaces can be split to mitigate overexposure or overlapping of secure and/or private content among users. For instance, imagine that a user has created a file share 700 for an especially large project. The project comprises multiple sub-projects (710, 720) and involves a plurality of people participating in each sub-project. Each person or groups of people may be granted access rights to the share space in general. Unfortunately, this can be problematic because some people only need access to information pertinent to their sub-project. Furthermore, allowing full access to the share space can lead to unnecessary disclosure or dissemination of confidential information.

As shown in the figure, for example, Group A may have access to test documents and results and Group B may have access to future development plans. In this case, Group A participants are not likely to need information included in the future development plans and/or vice versa due to security or other privacy concerns. To mitigate undesirable disclosure of information among share users, the share can be split in accordance with one aspect of the present invention. More specifically, the system and/or method can monitor and detect this type of activity and suggest to the author or creator of the share to split the share accordingly. As a result, a first share 730 can include content accessible by Group A and at least a second share$_P$ 740 (where P is an integer greater than one) can include content accessible by Group B. Though only two shares and two groups are shown, it should be understood that other variations are possible and such are contemplated to fall within the scope of the present invention.

Figure 8:
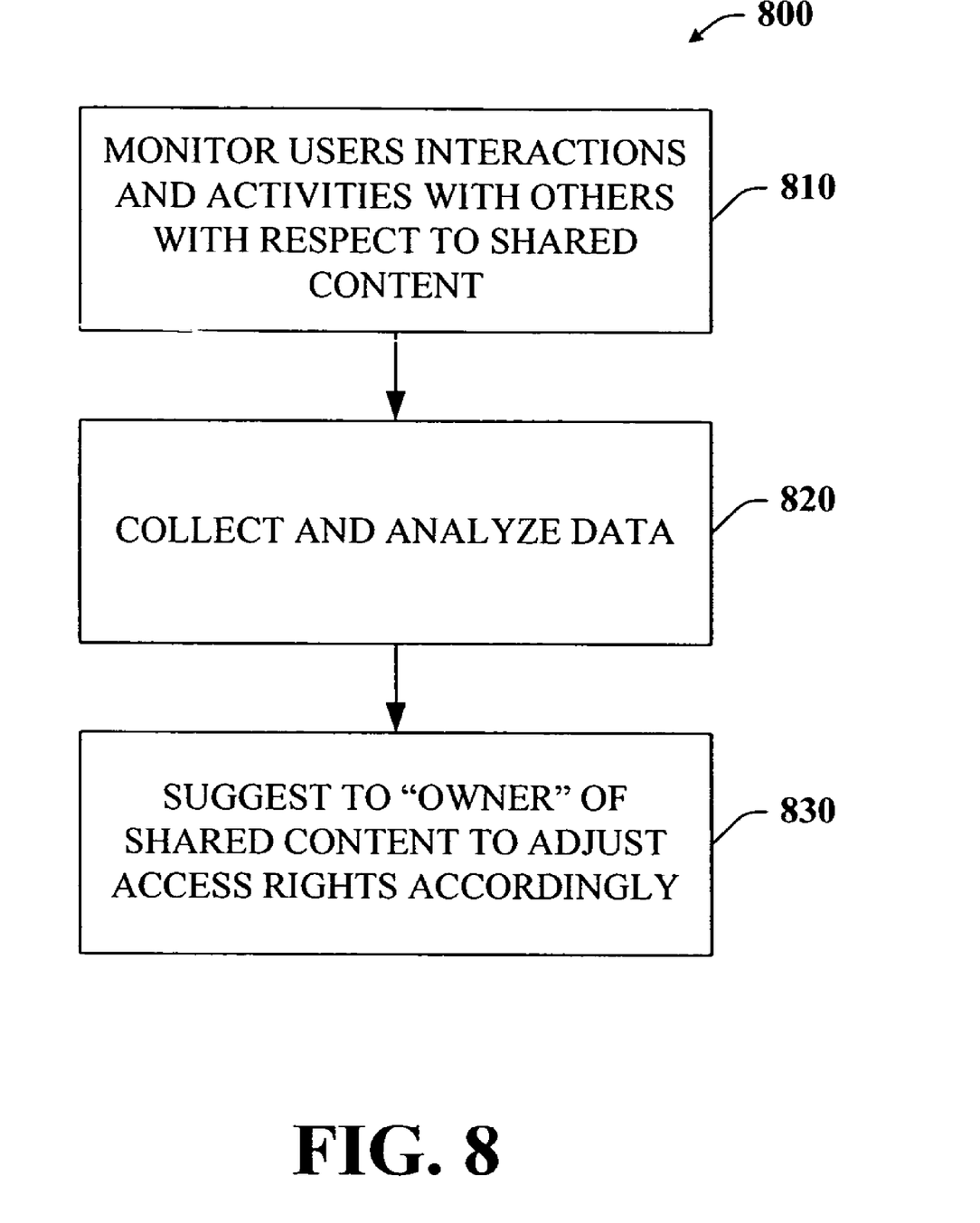
FIG. 8 is a flow chart illustrating an exemplary methodology that facilitates optimizing privacy and security of shared content in accordance with an aspect of the present invention.
Figure 9:
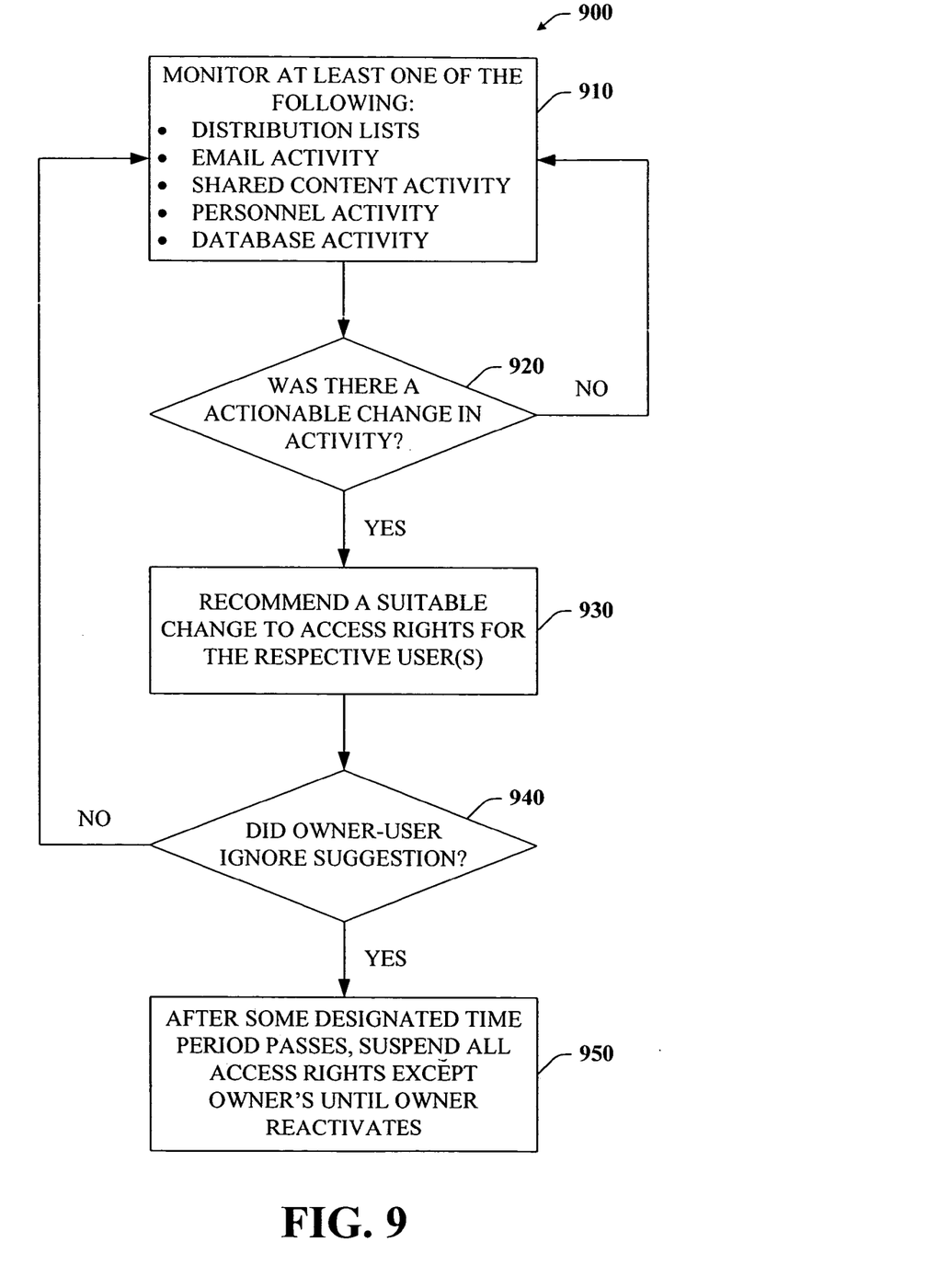
FIG. 9 is a flow chart illustrating an exemplary methodology that facilitates optimizing privacy and security of shared content in accordance with an aspect of the present invention.

FIGS. 8 and 9 which follow below are flow diagrams demonstrating methodologies in connection with various aspects of the present invention. In particular, FIG. 8 illustrates a flow diagram of an exemplary process 800 that facilitates mitigating overexposure of shared content. This can be accomplished in part by monitoring user interactions and other activities within a computing environment at 810. At 820, data from such monitoring can be collected and analyzed to determine if time period thresholds have been satisfied, for example. Such thresholds can be applicable when determining whether a period of inactivity by a user (e.g., user has not accessed content or received content or has been removed from contact or distribution list or personnel structure) or by content (e.g., content has no indication of activity during a set time period). When a particular time threshold or period has been satisfied and the pertinent activity or lack thereof has or has not occurred, then the process 800 can suggest to the owner or creator of the share space or content to adjust the access rights accordingly at 830.

In FIG. 9, there is a flow diagram of an exemplary process 900 that facilitates controlling and/or managing access rights to facilitate preserving and maintaining security and privacy of shared content. The process 900 can involve monitoring at least one of the following: distribution lists, email activity, content activity (within a database or share), personnel activity, and database activity at 910. Other types of user-based activities can be monitored as well. At 920, it can be determined whether an actionable change occurred while monitoring any one of the above items. If no actionable change was detected, then the monitoring can continue at 910 without any other action being taken. However, if a relevant change in the data was detected, it can be analyzed and a suitable adjustment to one or more sets of access rights can be recommended to the owner or controller of the shared content at 930. It should be appreciated that changes can or may be detected but no action may be required depending on the configuration of the system or process.

At 940, it can be determined whether the suggested modification to the access rights was ignored by the owner or controller of the shared content. Ignoring such recommendations (e.g., not taking any action to effect a change in the questionable access rights) can be problematic as it can jeopardize or compromise overall security of the shared content or the computing environment in general. If the recommendation was not ignored and some action was taken, then the process 900 can continue monitoring at 910. It should be understood that the monitoring of activities including distribution and other contact lists as well as user-based interactions can occur concurrently with one another and can continue to occur in the "background" while analyzing data and/or recommending adjustments to user access rights.

After some time period passes (e.g., a time threshold, other configuration or setting preference is satisfied) and no action has been taken with respect to the recommendation, the process 900 can be programmed at 950 to suspend the access rights belonging to the "questionable" users until the owner or controller of them explicitly reactivates such access rights.

The systems and/or methods described hereinabove can be turned on or off by the user according to user preferences. In addition, various settings can be selected as well to dictate the sensitivity or other feature functionalities according to user preferences. For example, when recommendations are affirmatively ignored (e.g., select "ignore" rather than "accept" button) can be considered an affirmative and satisfactory response to the recommendation. Recommendations can also occur in a variety of user-interface representations. For example, they can appear in a pop-up window or be represented by an icon in the near vicinity of the relevant content. Additionally, they can appear in column form as part of an access rights table wherein a listing of specific users and their designated access rights is maintained and easily adjusted by the owner of the content. Moreover, the present invention mitigates overexposure of content and facilitates improving security and file management at a user-, file-, share-, and/or database level.

Such systems and/or methods of the present invention can also be integrated with other applications such as an email or other messaging client. For example, if a user has indicated that he is out of the office via an out-of-office module, then this can be recognized and/or acknowledged such that any access rights that are attempted to given to the user are blocked. Similarly, suggestions to remove this user from the share are also blocked or not made until it is sensed that the user's out-of-office indicator is turned off.

In other types of applications, the systems and/or methods of the present invention can alert an owner of a share or of shared content that the user lacks the appropriate application or viewer to interact with, access, or open the content. The alert can come concurrently with when or shortly after the user's access rights are modified or shortly after the owner requests to share the content with the user(s).

Because content in a share space, the share space itself, and/or access rights can be set to expire after some time period (whether activity is detected or not), the affected users can be notified that the shared content, share space and/or set or subset of access rights are about to expire. This facilitates an improved computing environment and mitigates operation interruptions due to expired content, share spaces, or access rights.

Figure 10:
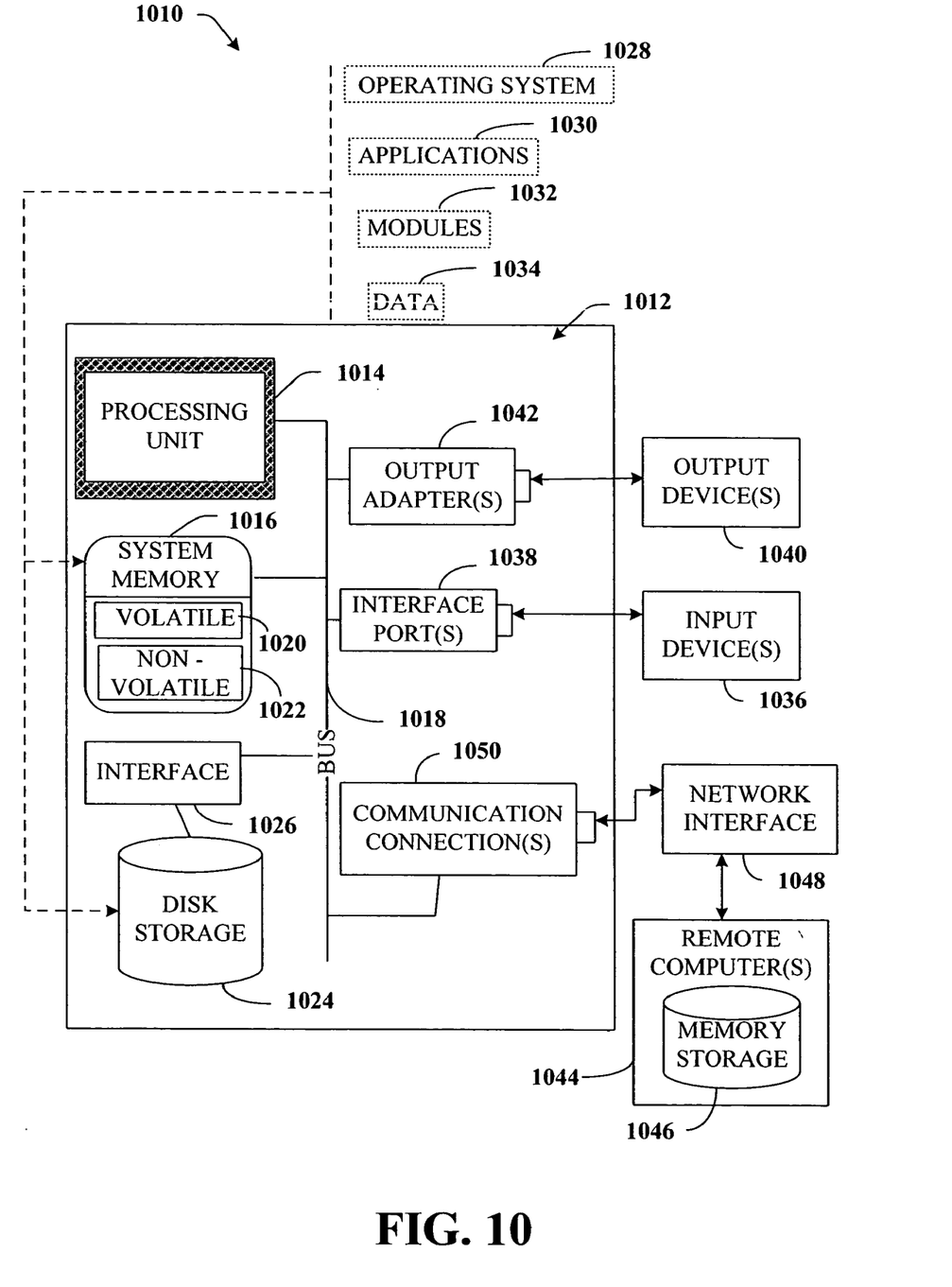
FIG. 10 illustrates an exemplary environment for implementing various aspects of the invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media and/or computer readable medium having stored thereon the system(s) previously discussed. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of mitigating overexposure of shared content, the method comprising:
   employing one or more processors that execute computer-executable instructions retained in one or more memories, the computer-executable instructions when executed by the one or more processors implement actions comprising:
   monitoring a plurality of resources and one or more user interactions with one or more of the plurality of resources and the shared content included within a share space in a computing environment;
   collecting data from the monitored plurality of resources and one or more user interactions with the one or more of the plurality of resources, the data comprising personnel structure information and activities that change the personnel structure information;
   analyzing data collected from the plurality of resources, the analyzing comprising analyzing user access rights in connection with the shared content included within the share space to determine whether to suggest splitting the share space such that a first portion of the shared content is available for access in a split share space resulting from splitting the share space and a second portion of the shared content is unavailable for access in the split share space resulting from splitting the share space;
   automatically providing a suggestion to a user to adjust at least a portion of user access rights to the shared content based at least in part upon an analysis of the data to facilitate maintaining consistency in delineating the user access rights; and
   suspending all access rights to the shared content except those of the user's when the user is unresponsive to the suggestion during a predefined time period.

2. The method of claim 1, wherein the user is an owner or manager of the shared content.

3. The method of claim 1, further comprising adjusting the user access rights with respect to the shared content.

4. The method of claim 1, wherein the plurality of resources comprising at least one of the following:
   user sharing activity;
   user publishing activity;
   messaging activity;
   distribution list activity;
   contact list activity;
   content activity;
   share activity;
   database activity;
   access activity;
   access restrictions that are time-dependent; or
   user activity.

5. The method of claim 1, wherein the monitoring the plurality of resource activity comprises at least one of the following:
   monitoring interactions between one or more users and the shared content;
   monitoring one or more users' inactivity;
   monitoring inactivity of shared content; or
   monitoring interactions between one or more users and a distribution or contact list that is associated with the shared content.

6. The method of claim 1, wherein the analyzing the data collected from the plurality of resources comprises cross-referencing the data from the plurality of resources to detect changes in any one of the resources.

7. The method of claim 1, wherein the analyzing the data comprises at least one of the following:
   comparing a period of user inactivity with a first time threshold to determine whether an adjustment to the user access rights should be suggested;
   comparing a period of shared content inactivity with a second time threshold to determine whether an adjustment to the user access rights should be suggested;
   analyzing user access rights and the respective shared content included within any one share space to determine whether to suggest splitting the share space; or
   comparing previously collected data with newly collected data to determine that a change in at least one activity has occurred to thereby provoke the suggestion component to recommend a corresponding adjustment to access rights.

8. The method of claim 1, wherein the providing the suggestion to adjust the user access rights comprises determining from the analysis that a change has occurred with respect to at least one resource activity that warrants a corresponding change to the user access rights.

9. The method of claim 8, wherein the change comprises at least one of a removal or addition of one or more users as indicated by a corresponding contact name, username, nickname, or email address.

10. The method of claim 1, wherein the suggestion comprises any one of the following actions to at least a portion of the user access rights:
    restrict access rights;
    remove access rights;
    add access rights;
    split access rights;
    suspend access rights; or
    maintain access rights.

11. The method of claim 10, wherein the user access rights are maintained when the user indicates a period of inactivity.

12. The method of claim 10, wherein the user access rights are added or removed when a new user is respectively added to or removed from any one of a share, a contact list, a distribution list, a personnel structure, or an email.

13. The method of claim 10, wherein the user access rights are split in part by splitting the share space to mitigate overexposure of the shared content to one or more users whose user access rights should be specific to content included in the share space rather than to the share space in general.

14. The method of claim 1, the method further comprising resuming the suspended access rights when the user explicitly reactivates the suspended access rights.

15. One or more memories comprising computer-executable instructions that, when executed by one or more processors, configure the one or more processors to perform the following actions:
- monitoring a plurality of resources and one or more user interactions with one or more of the plurality of resources and the shared content included within a share space in a computing environment;
- collecting data from the monitored plurality of resources and one or more user interactions with the one or more of the plurality of resources, the data comprising personnel structure information and activities that change the personnel structure information;
- analyzing data collected from the plurality of resources, the analyzing comprising analyzing user access rights in connection with the shared content included within the share space to determine whether to suggest splitting the share space such that a first portion of the shared content is available for access in a split share space resulting from splitting the share space and a second portion of the shared content is unavailable for access in the split share space resulting from splitting the share space;
- automatically providing a suggestion to a user to adjust at least a portion of user access rights to the shared content based at least in part upon an analysis of the data to facilitate maintaining consistency in delineating the user access rights; and
- suspending all access rights to the shared content except those of the user's when the user is unresponsive to the suggestion during a predefined time period.

16. The one or more memories of claim 15, wherein the user is an owner or manager of the shared content.

17. The one or more memories of claim 15, wherein the actions further comprise adjusting the user access rights with respect to the shared content.

18. The one or more memories of claim 15, wherein the plurality of resources comprising at least one of the following:
- user sharing activity;
- user publishing activity;
- messaging activity;
- distribution list activity;
- contact list activity;
- content activity;
- share activity;
- database activity;
- access activity;
- access restrictions that are time-dependent; or
- user activity.

19. The one or more memories of claim 15, wherein the analyzing the data collected from the plurality of resources comprises cross-referencing the data from the plurality of resources to detect changes in any one of the resources.

20. The one or more memories of claim 15, wherein the analyzing the data comprises at least one of the following:
- comparing a period of user inactivity with a first time threshold to determine whether an adjustment to the user access rights should be suggested;
- comparing a period of shared content inactivity with a second time threshold to determine whether an adjustment to the user access rights should be suggested;
- analyzing user access rights and the respective shared content included within any one share space to determine whether to suggest splitting the share space; or
- comparing previously collected data with newly collected data to determine that a change in at least one activity has occurred to thereby provoke the suggestion component to recommend a corresponding adjustment to access rights.

21. The one or more memories of claim 15, wherein the providing a suggestion to adjust user access rights comprises determining from the analysis that a change has occurred with respect to at least one resource activity that warrants a corresponding change to the user access rights.

22. The one or more memories of claim 15, wherein the change comprises at least one of a removal or addition of one or more users as indicated by a corresponding contact name, username, nickname, or email address.

23. The one or more memories of claim 15, wherein the suggestion comprises any one of following actions to at least a portion of the user access rights:
- restrict access rights;
- remove access rights;
- add access rights;
- split access rights;
- suspend access rights; or
- maintain access rights.

24. The one or more memories of claim 23, wherein the user access rights are added or removed when a new user is respectively added to or removed from any one of a share, a contact list, a distribution list, a personnel structure, or an email.

25. The one or more memories of claim 23, wherein the user access rights are split in part by splitting the share space to mitigate overexposure of shared content to one or more users whose access rights should be specific to content included in the share space rather than to the share space in general.

26. A system comprising:
- one or more processors; and
- memory, communicatively coupled to the one or more processors, storing instructions that, when executed by the one or more processors, configure the one or more processors to perform actions comprising:
  - monitoring a plurality of resources and one or more user interactions with one or more of the plurality of resources and the shared content included within a share space in a computing environment;
  - collecting data from the monitored plurality of resources and one or more user interactions with the one or more of the plurality of resources, the data comprising personnel structure information and activities that change the personnel structure information;
  - analyzing data collected from the plurality of resources, the analyzing comprising analyzing user access rights in connection with the shared content included within the share space to determine whether to suggest splitting the share space such that a first portion of the shared content is available for access in a split share space resulting from splitting the share space and a second portion of the shared content is unavailable for access in the split share space resulting from splitting the share space;
  - automatically providing a suggestion to a user to adjust at least a portion of user access rights to the shared content based at least in part upon an analysis of the data to facilitate maintaining consistency in delineating the user access rights; and
  - suspending all access rights to the shared content except those of the user's when the user is unresponsive to the suggestion during a predefined time period.

* * * * *